W. D. MOORE.
PIPE JOINT.
APPLICATION FILED NOV. 10, 1919.
1,365,530.
Patented Jan. 11, 1921.
2 SHEETS—SHEET 2.
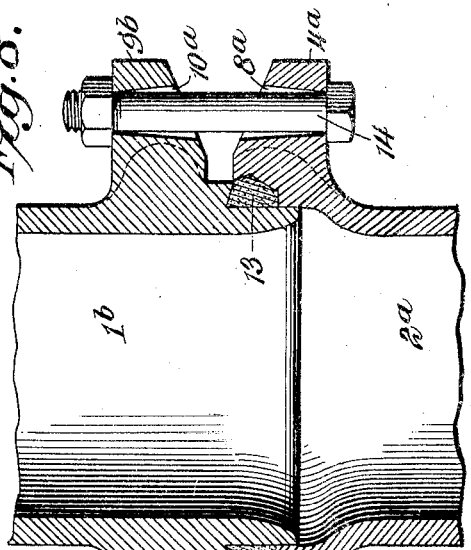
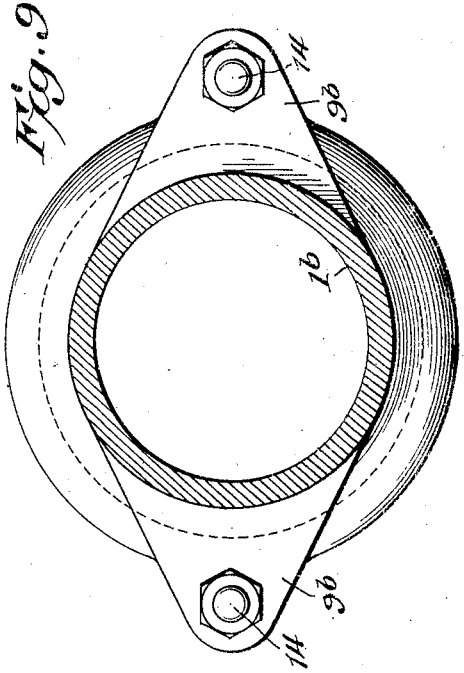
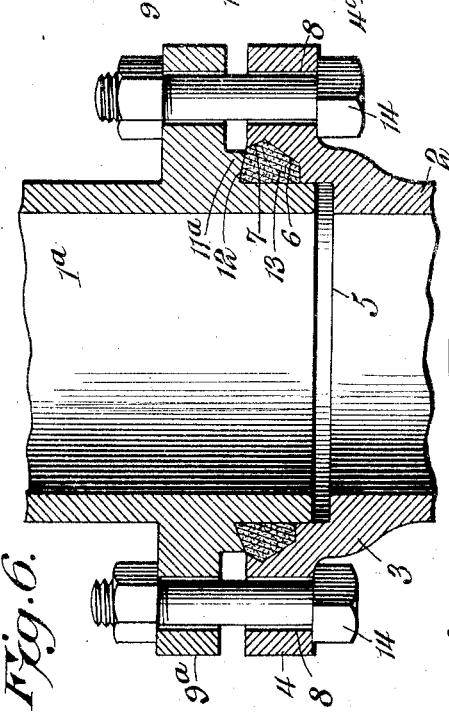
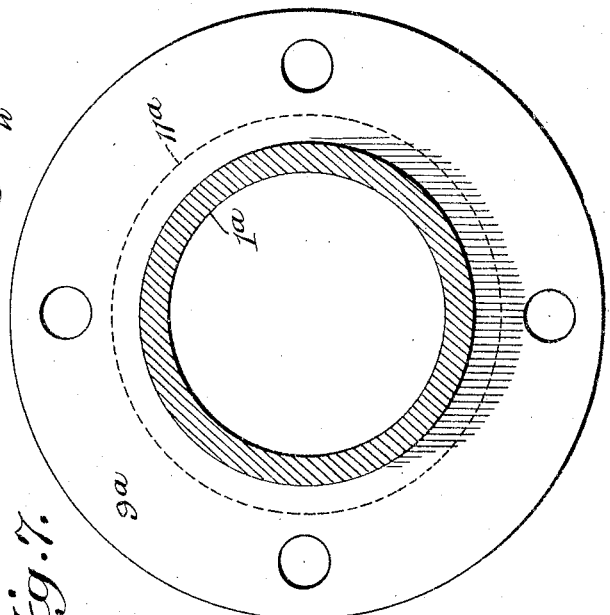
WITNESSES
Howard D. Orr.
F. T. Chapman.
William D. Moore, INVENTOR,
BY E. G. Siggers.
ATTORNEY

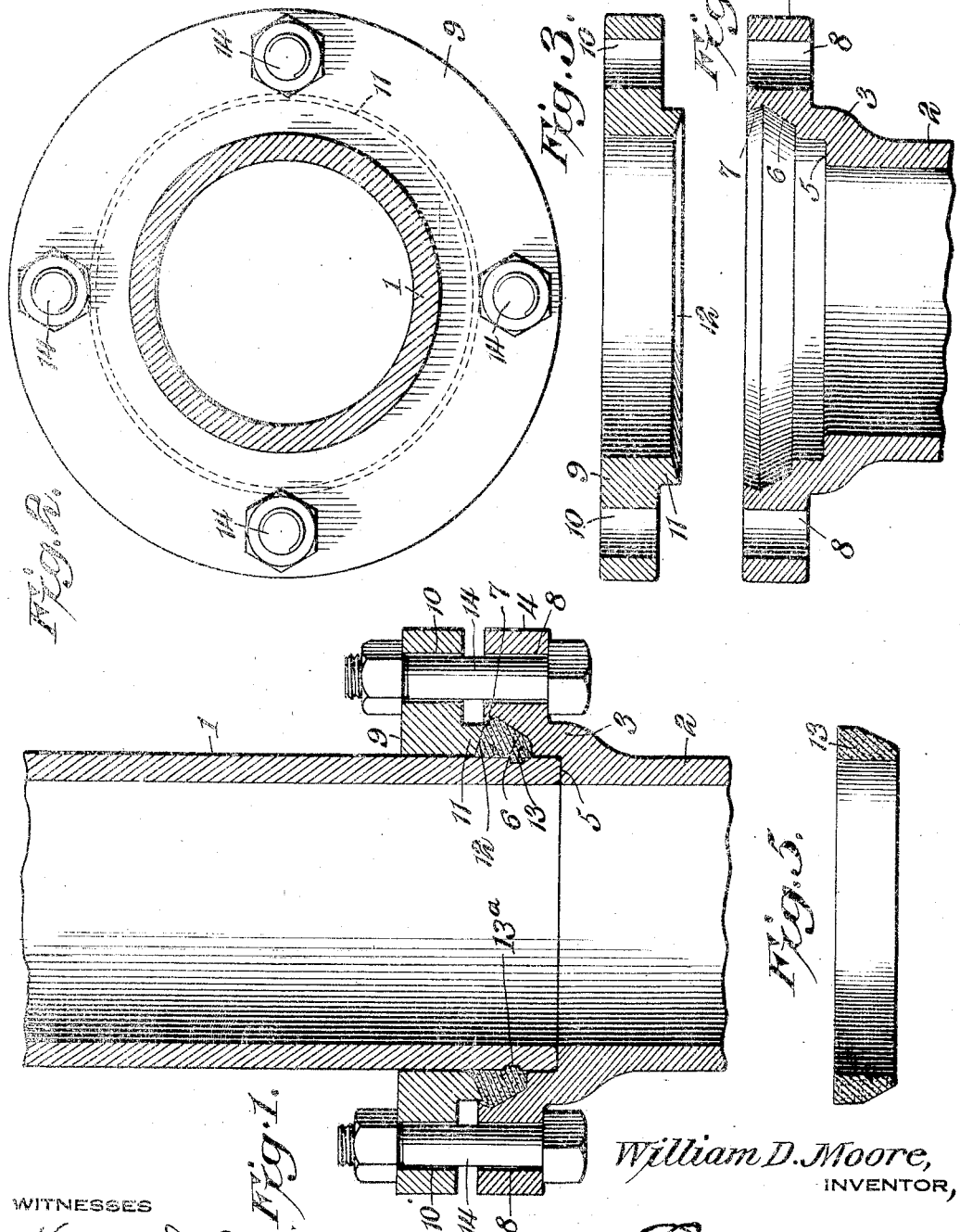

UNITED STATES PATENT OFFICE.

WILLIAM DAVIS MOORE, OF BIRMINGHAM, ALABAMA.

PIPE-JOINT.

1,365,530.  Specification of Letters Patent.  Patented Jan. 11, 1921.

Application filed November 10, 1919. Serial No. 336,932.

*To all whom it may concern:*

Be it known that I, WILLIAM D. MOORE, a citizen of the United States, residing at Birmingham, in the county of Jefferson and State of Alabama, have invented a new and useful Pipe-Joint, of which the following is a specification.

This invention has reference to pipe joints and more particularly to joint structures for use in connection with cast and other iron pipe. The object of the invention is to provide a simple and efficient joint for either high or low pressure, and while the joint is especially useful in connection with both high and low pressure cast iron condenser piping, it may be used for many other purposes.

When the joint is used in connection with high pressure piping, one end of the pipe is provided with a flange so formed as to constitute a gland to enter the female portion or bell end of the pipe, while in the case of low pressure piping the gland may be made separately from the spigot end of the pipe and surround the latter. In both cases packing in the form of a gasket is employed and the gland and the bell end of the pipe are so formed that the gasket can be forced into fluid-tight relation to the walls of the plain portion of spigot-end and to the bell by means of suitable bolts. The joint is susceptible of construction in such manner as to remain fluid-tight even under considerable deflection and also expansion and contraction of the piping at the joint.

The invention will be best understood from a consideration of the following detailed description taken in connection with the accompanying drawings forming part of this specification, with the understanding, however, that the invention is not confined to any strict conformity with the showing of the drawings, but may be changed and modified so long as such changes and modifications mark no material departure from the salient features of the invention as expressed in the appended claims.

In the drawings,

Figure 1 is a longitudinal section through a pipe joint embodying the invention but intended more particularly for low pressure.

Fig. 2 is a plan view of the joint of Fig. 1 with the piping shown in cross section.

Fig. 3 is a diametric section of the gland member of the joint.

Fig. 4 is a diametric section of the bell end of the pipe.

Fig. 5 is a diametric section of the packing ring employed.

Fig. 6 is a view similar to Fig. 1 but showing a type of joint adapted for high pressure.

Fig. 7 is a plan view of the gland shown in Fig. 6 and with the spigot end of the pipe in cross section.

Fig. 8 is a view similar to Fig. 6 but showing a form of pipe joint embodying two diametrically opposite ears.

Fig. 9 is a plan view of the joint of Fig. 8 with the spigot end of the pipe in cross section.

Referring first to Figs. 1 to 5, inclusive, there is shown a spigot end 1, and a bell end 2, of joining sections of iron pipe constituting a joint, the spigot end 1 differing from the spigot end of ordinary commercial bell and spigot cast iron pipe, in that the usual exterior terminal bead or rib of the spigot end is omitted, wherefore, the exterior of the spigot end of the pipe is substantially cylindrical and has no protuberances where entering the bell end of the pipe. Moreover, the bell end 2 is formed with a bell or socket 3 of considerably less axial depth than usual, and from the bell end there outstands a radial flange 4 which may extend about the bell 3 for its full circumference. At the inner or basic end of the bell or socket 3, there is formed a shoulder 5 to receive the corresponding extremity of the spigot end 1 of the companion pipe section. Extending from near the shoulder 5 to the outer end of the bell there is an interior circumferential outwardly flaring wall 6, with its inner end merging into a shoulder 6ª and its outer end terminating in an inturned portion 7 at the mouth of the bell.

When the spigot end 1 is introduced into the bell 3, the two parts coact to produce a packing receptacle of a cross section approximating a right-angle triangle, having the basic end shortened by the inturned wall 7 and the apex of the triangle of relatively blunt formation due to the shoulder 6ª, while the hypotenuse of the triangle is produced by the flaring wall 6. The flange 4 is provided with a circular series of bolt holes 8 conveniently produced in the casting of the pipe by suitable cores.

Adapted to the spigot end 1 so as to move freely thereon is a gland ring 9 having a circular series of bolt holes 10 formed therein to match the bolt holes 8. From one surface of the gland ring there projects a rib 11 immediately adjacent to the inner periphery of the ring and of a thickness radially of the ring to fit into the packing receptacle when the gland ring is moved theretoward. That portion of the rib 11 remote from the surface of the gland ring from which it projects is beveled outwardly, as indicated at 12.

There is also provided a packing ring 13 constructed of suitable material and conforming generally to the shape of the receptacle provided by the groove 6 and the walls of the bell-and-spigot ends when the parts are in assembled position. A fabricated asbestos ring has proven satisfactory in practice, but the invention is not confined to such particular packing ring, for any suitable material which will yield to a sufficient extent to conform to the shape of the packing receptacle when pressed therein, will answer. To provide for the desirable packing of the ring 13, in the receptacle provided for it, the ring is made so as to be initially somewhat longer axially than the depth of the receptacle lengthwise of the joint.

When the parts are assembled the gland ring 9 is applied to the spigot end 1 and this is followed by the packing ring 13, whereupon the spigot end 1 is introduced into the bell end 2 and may seat or nearly seat on the shoulder 5. The bolt holes 10 are located to match the bolt holes 8 and suitable bolts 14 are then passed through the matching holes and screwed up tight.

The exterior of the spigot end is provided with a circumferential groove 13ª (see Fig. 1) into which the packing is forced when the joint is assembled, thus increasing the tightness of the joint and its resistance to forces which would otherwise push the pipes apart lengthwise. Were it not for the groove 13ª, the joint described with reference to Fig. 1 and associated figures would be limited to low-pressure work, irrespective of the character of the fluid employed. The groove 13ª very largely increases the holding power of the joint against pressures tending to expel the spigot end of the pipe from the bell end thereof.

Resistance to such expulsive effort could, of course, be obtained by a bead formed on the spigot end of the pipe, but such bead is prohibited in the type of joint where a gland and packing ring are provided as in Fig. 1 and other forms of the joint, since both the gland and packing ring would have to be of large enough internal diameter to be slipped over such bead or rib.

There is a particular advantage in providing the groove 13ª since such groove can be cut anywhere along the pipe, whereas a projection cast on the spigot end of the pipe must be kept to a definite position. The cast iron pipe, because of conditions due to its manufacture, will vary in length so that where it must be made to specifications, it is produced in certain general lengths and then cut to the special lengths demanded, and the groove 13ª may be formed at the same time by using the cutting off tool appropriately shifted with respect to the pipe.

When high pressure fluid is to be handled the joint of Figs. 6 and 7, or of Figs. 8 and 9 is needed. In Figs. 6, there is shown a joint between the spigot end of 1ª of cast iron pipe and the bell end 2. Instead of providing a gland ring 9, the spigot or plain end 1ª is provided with a gland flange 9ª which may be in all respects like the gland 9 except that it is cast in one piece with the spigot end 1ª of the pipe. The parts which make up the joint shown in Fig. 6 are like those of Fig. 1 and the same reference numerals are used except that instead of the rib 11 there is a rib 11ª cast integral with the spigot end 1ª. When the two ends of the pipe are brought properly together with the packing ring 13 between them, the bolts 14 are introduced and tightened, thus compressing the packing ring 13 in the same manner as in the structure of Fig. 1. There is, however, this difference. When the two members of the joint are brought together and secured by the bolts 14 there can be no endwise movement of the joint members tending to separate them, since the spigot end 1ª cannot move with reference to the flange 9ª and so the parts are substantially joined and consequently the joint will stand high internal pressure under which the joint of Fig. 1 might pull apart.

Where flexibility of the joint is desirable, the structure of Fig. 8 is used. In Fig. 8 and the companion Fig. 9, the flange 9 or 9ª is replaced by two diametrically opposite ears 9ᵇ and the flange 4 on the bell end of the pipe is replaced by corresponding ears 4ª. The two sets of ears 4ª and 9ᵇ are provided with bolt holes 8ª and 10ª which may be produced by coring in the casting operation and may have a flare toward each other. When the spigot end 1ᵇ of the form shown in Fig. 8 is introduced into the bell end 2ª of Fig. 8, the bolt holes 8ª and 10ª are brought into alinement and in underground work the ears 4ª and 9ᵇ are arranged in a horizontal plane widthwise of the pipe. The structure of Fig. 8, like that of Fig. 6, is intended to withstand high internal pressure, but in underground work or wherever there is a liability of deflection of the pipe, the structure of Fig. 8 will permit some giving of the pipe, due to expansion and contraction and deflection, without affecting the tightness of the joint.

In the structure of Fig. 1, dependence is had upon the grip of the packing ring 13 on the walls of the inserted spigot or plain end of the pipe and where entering the groove 13ª, the compressive action being due to the movable gland forced against the packing by the bolts 14. It is for this reason that the joint of Fig. 1 will not withstand such high pressures as the joints of Figs. 6 and 8, which, are adapted for both low and high pressure and particularly for high pressure, while the joint of Fig. 8 is especially adapted to conditions where there is a liability or a necessity of deflecting the straight continuity of the pipe after laying.

The entire joint is so made as to require no fitting whatever, such fit or approach to a fit as may be obtained by casting being ample. The spigot end is made to set into the bell end with some slight clearance, as more particularly illustrated in Figs. 6 and 8. A clearance endwise of one-sixteenth of an inch more or less is sufficient, and there is provided some sidewise play. The outward bevel of the rib formed on the gland for entering the packing receptacle in the joint and which serves to force the packing both inwardly with respect to the length of the packing receptacle in the bell and axially toward the outer surface of the spigot end within the bell, thus giving a dual compression which is further enhanced by the taper form of the outer wall of the receptacle toward the base of the bell. All surfaces engaged by the packing are pressed against with sufficient force to completely seal the joint against the internal pressure employed.

For heavy pressures and also for large pipes, four or more bolts are advantageous. Where a certain flexibility of the joint is desirable, but two bolts are used, and the two pipe sections are provided with diametrically opposite matching ears for the bolts.

The invention comprises either the bell-and-spigot, the flange or the ball-and-socket types of joint, that is, it combines all the desirable features of the several types of joints without having any of the marked disadvantages of them. The joint is particularly flexible, this being due in part to the gasket arrangement, the packing gasket approximating the right-angular form in the direction of compressive forces upon the gasket in seating it. When the rib 11 or 11ª engages the base of the gasket at the mouth of the bell, the gasket is forced into the gasket- or packing-ring receptacle substantially lengthwise of the spigot end of the pipe close to the outer wall of such spigot end, and toward the blunt end of the packing-ring receptacle in the joint, thus forcing the packing ring against the flaring wall 6 so as to cause a movement of the packing ring lengthwise of the joint, but this movement is resisted by the blunt end of the receptacle at 6ª. The result is, that the compressive forces are deflected into lines substantially perpendicular to the outer wall of the spigot end 1 where within the joint and the packing ring or gasket, is forced firmly against that portion of the spigot end 1 within the joint, thus completely sealing the points of contact of the packing ring with both the bell-and-spigot parts of the joint.

In the actual commercial form of the joint, the depth of the bell or socket 3 in different sizes of pipe, is only about 1¼ inches to the bottom of the seat 5 as compared with 3 or more inches in ordinary cast iron bell-and-spigot pipe joints. The depth of the packing receptacle in the joint approximates ⅞ of an inch in the direction of the length of the joint and about ¾ of an inch axially. Because of the lack of closeness of fit in cast iron pipe and the presence of clearance, as well as the shallowness of the socket portion of the bell end of the pipe, there is no danger of metal-to-metal binding or the production of side strains which might prove destructive to the joint. Moreover, considerable deflection may occur both in the laying of the pipes and afterward, without affecting the production of a good first-class joint, and the maintenance of its effectiveness indefinitely. Moreover, the shallowness of the joint permits the ready removal of pipe sections from laid lines of pipe and the return or replacing of such pipe sections should conditions require such manipulations.

The packing ring is much larger in cross section than in the ordinary flange type, of joint, and the relatively bulky form of packing ring or gasket provides for the maintenance of the leak-proof condition of the joint indefinitely. Such a joint would be impossible were rigid flanges with a thin gasket employed.

What is claimed is:—

1. A pipe joint structure comprising a bell member with a packing-receiving groove, a spigot member for entrance into the bell and having its outer wall cylindrical and free from protuberances, the bell-and-spigot members, when assembled, defining an approximately triangular packing receptacle broadening toward the mouth of the bell with the inner wall of the receptacle substantially concentric with the longitudinal center line of the joint and its outer wall flaring, said receptacle narrowing in diameter toward the inner or basic end and there relatively blunt, a wedge-shaped packing ring having one end adapted to seat against the blunt end of the receptacle and the other end directed toward the mouth of the receptacle, and means for entering the mouth of the receptacle and coactively related to both the bell-and-spigot ends of the pipe forming the joint to engage the broader end of the packing ring and force the latter into abutment with the blunt end of the packing receptacle and against the taper wall in the bell end and the outer wall of the spigot end of the joint.

2. A pipe joint structure comprising a bell end with a groove having its outer wall flaring outwardly from the inner or basic end toward the mouth of the groove, an exteriorly cylindrical spigot pipe-end, of a diameter to enter the bell end and there free from external protuberances, the bell-and-spigot ends when assembled, defining a receptable of approximately right angle triangular cross section with the base of the triangle presented toward the mouth of the bell, a packing ring tapering from one end toward the other and there blunt with the cross sectional shape of the ring in approximote conformity to that of the packing-receiving receptacle, and means associated with the spigot end of the pipe for attachment to the bell end of the pipe to engage the larger end of the packing-ring in the receptacle to move the packing ring along the flaring wall of the bell and compress the packing ring lengthwise in contact with the receptacle and crosswise against the outer wall of the spigot end of the pipe substantially perpendicular to said outer wall.

3. A pipe joint structure comprising a bell member and a spigot member adapted thereto, the bell member provided with an interior seat extension at its inner end to receive the extremity of the spigot member and also provided between the seat extension and the mouth of the bell member with an outwardly flaring circumferential groove merging at the smaller end into an inwardly extending shoulder terminating at the seat portion of the bell member, the outer wall of the spigot member and the wall of the groove in the bell member defining a receptacle for packing, a packing ring of approximately right angle triangular cross section adapted to the receptacle, and means for forcing the packing ring with the small end toward the seat into engagement therewith and with the walls of the flaring groove and by the reaction of the walls of the groove into engagement with the spigot member on lines substantially perpendicular to the length of the spigot member.

4. A pipe joint structure comprising a bell member, a spigot member entering the bell member, the latter having an interior circumferential groove in encircling relation to the outer surface of the spigot member to define a packing chamber and said groove having its outer wall flaring toward the mouth of the bell member to define, in conjunction with the spigot member, a substantially right-angle triangular packing receptacle with the base of the triangle at the mouth end of the bell member and the apex of the triangle blunt, an approximately right-angle triangular packing ring in the receptacle, means surrounding the spigot member and entering the mouth of the receptacle, and means for forcing the first-named means into engagement with the basic end of the packing ring to force the latter along the flaring wall in the bell and against the inner end of the receptacle, with the inner wall of the packing ring moved against the outer wall of the spigot member within the receptacle in a direction substantially perpendicular to the length of said spigot member.

5. A pipe joint structure comprising a bell member, a spigot member, an approximately right-angle triangular packing ring, and means for engaging the packing ring to move it lengthwise of the spigot member into the bell member, the latter having a circumferential groove in the wall remote from the spigot member and tapering toward the inner end whereby the bell and spigot members define a packing ring receptacle between them of approximately right-angle triangular form in cross section and the packing ring is forced both lengthwise of the joint and in a direction toward the outer surface of the spigot end substantially perpendicular to the length of the latter.

In testimony that I claim the foregoing as my own I have hereto affixed my signature in the presence of two witnesses.

WILLIAM DAVIS MOORE.

Witnesses:
E. W. MATTSON,
E. L. GILDER.